(12) United States Patent
Wang et al.

(10) Patent No.: US 11,018,730 B2
(45) Date of Patent: May 25, 2021

(54) METHOD AND APPARATUS FOR INTERFERENCE MEASUREMENT USING BEAM MANAGEMENT REFERENCE SIGNAL

(71) Applicant: Apple Inc., Cupertino, CA (US)

(72) Inventors: Guolong Wang, Beijing (CN); Yushu Zhang, Beijing (CN); Qian Li, Beaverton, OR (US); Alexei Davydov, Nizhny Novgorod (RU); Seok Chul Kwon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/484,040

(22) PCT Filed: May 2, 2018

(86) PCT No.: PCT/CN2018/085318
§ 371 (c)(1),
(2) Date: Aug. 6, 2019

(87) PCT Pub. No.: WO2018/202036
PCT Pub. Date: Nov. 8, 2018

(65) Prior Publication Data
US 2020/0021337 A1 Jan. 16, 2020

(30) Foreign Application Priority Data

May 2, 2017 (WO) ................ PCT/CN2017/082730

(51) Int. Cl.
*H04J 1/16* (2006.01)
*H04B 7/0417* (2017.01)
*H04B 17/345* (2015.01)
*H04B 7/0452* (2017.01)
*H04B 7/06* (2006.01)

(52) U.S. Cl.
CPC .......... *H04B 7/0417* (2013.01); *H04B 7/0452* (2013.01); *H04B 7/0632* (2013.01); *H04B 17/345* (2015.01)

(58) Field of Classification Search
CPC .. H04B 7/0417; H04B 17/345; H04B 7/0452; H04B 7/0632; H04B 7/0617; H04J 11/0026; H04L 5/00; H04W 24/02
(Continued)

(56) References Cited

U.S. PATENT DOCUMENTS

2012/0327800 A1* 12/2012 Kim ................ H04J 11/005
370/252
2013/0250788 A1* 9/2013 Kim ................ H04J 11/0023
370/252
(Continued)

FOREIGN PATENT DOCUMENTS

CN 102149124 A 8/2011
EP 2981143 2/2016
(Continued)

OTHER PUBLICATIONS

International Patent Office—International Search Report and Written Opinion dated Jul. 27, 2018, from International Application No. PCT/CN2018/085318, 9 pages.
(Continued)

*Primary Examiner* — Mang Hang Yeung
(74) *Attorney, Agent, or Firm* — Fish & Richardson P.C.

(57) ABSTRACT

Provided herein are a method and an apparatus for interference measurement using a beam management reference signal (BM-RS). The disclosure provides an apparatus for a user equipment (UE), comprising circuitry configured to: decode one or more beam management reference signals broadcasted by a Transmission Reception Point (TRP) in a cell, wherein the one or more beam management reference
(Continued)

signals are used by the TRP to perform beam management for respective one or more other UEs in the cell; and measure interference from the one or more other UEs in the cell based on the decoded one or more beam management reference signals. According to some embodiments, the overhead for the interference measurement can be reduced since it is not necessary to allocate a separate CSI-RS for the purpose of interference measurement.

23 Claims, 11 Drawing Sheets

(58) Field of Classification Search
USPC .......................................................... 370/252
See application file for complete search history.

(56) References Cited

U.S. PATENT DOCUMENTS

| 2014/0198751 | A1  | 7/2014 | Prasad et al. |
| 2014/0211723 | A1* | 7/2014 | Xia .................... H04L 5/0053 370/329 |
| 2018/0063693 | A1* | 3/2018 | Chakraborty ......... H04W 8/005 |
| 2018/0227035 | A1* | 8/2018 | Cheng .................. H04B 7/0695 |
| 2019/0239170 | A1* | 8/2019 | Thangarasa ........... H04W 16/18 |

FOREIGN PATENT DOCUMENTS

| WO | 2014172863 A1 | 10/2014 |
| WO | 2016056970 A1 | 4/2016 |

OTHER PUBLICATIONS

EP Partial Supplementary European Search Report in European Appln. No. 18793801.4, dated Nov. 5, 2020, 16 pages.

NTT Docomo Inc (Rapporteur), "RAN WG's progress on NR technology SI in the October meeting", 3GPP Draft; R2-168015, 3GPP TSG-RAN WG2 #96, Nov. 14-18, 2016, Reno, USA. 28 Pages.

EP Extended European Search Report in European Appln. No. 18793801.4, dated Mar. 2, 2021, 19 pages.

ZTE et al., "Discussion on Measurements and RS Design for CLI Mitigation," 3GPP TSG RAN WG1 Meeting #88, R1-1701615, Athens, Greece, Feb. 13-17, 2017, 13 pages.

* cited by examiner

METHOD AND APPARATUS FOR INTERFERENCE MEASUREMENT USING BEAM MANAGEMENT REFERENCE SIGNAL

CROSS REFERENCES TO RELATED APPLICATIONS

This application is a national phase entry under 35 U.S.C. § 371 of International Application No. PCT/CN2018/085318, filed May 2, 2018, entitled "METHOD AND APPARATUS FOR INTERFERENCE MEASUREMENT USING BEAM MANAGEMENT REFERENCE SIGNAL," which claims priority to International Application No. PCT/CN2017/082730 filed on May 2, 2017, entitled "INTERFERENCE MEASUREMENT USING BEAM MANAGEMENT REFERENCE SIGNAL", which are incorporated by reference herein in their entireties for all purposes.

TECHNICAL FIELD

Embodiments of the present disclosure generally relate to the field of wireless communications, and particularly to a method and an apparatus for interference measurement using a beam management reference signal (BM-RS).

BACKGROUND ART

In order to do link adaptation, it is important to estimate interference so that a channel quality indication (CQI) can be calculated accurately. Interference measurement resource (IMR) needs to be allocated to perform interference measurement. The IMR transmission may be periodic, semi-persistent or aperiodic and the IMR may be based on a channel status information reference signal (CSI-RS), including a zero-power CSI-RS (ZP CSI-RS) and a non-zero power CSI-RS (NZP CSI-RS).

SUMMARY

An embodiment of the disclosure provides an apparatus for a user equipment (UE), including circuitry configured to: decode one or more beam management reference signals broadcasted by a Transmission Reception Point (TRP) in a cell, wherein the one or more beam management reference signals are used by the TRP to perform beam management for respective one or more other UEs in the cell; and measure interference from the one or more other UEs in the cell based on the decoded one or more beam management reference signals.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Figure 1:
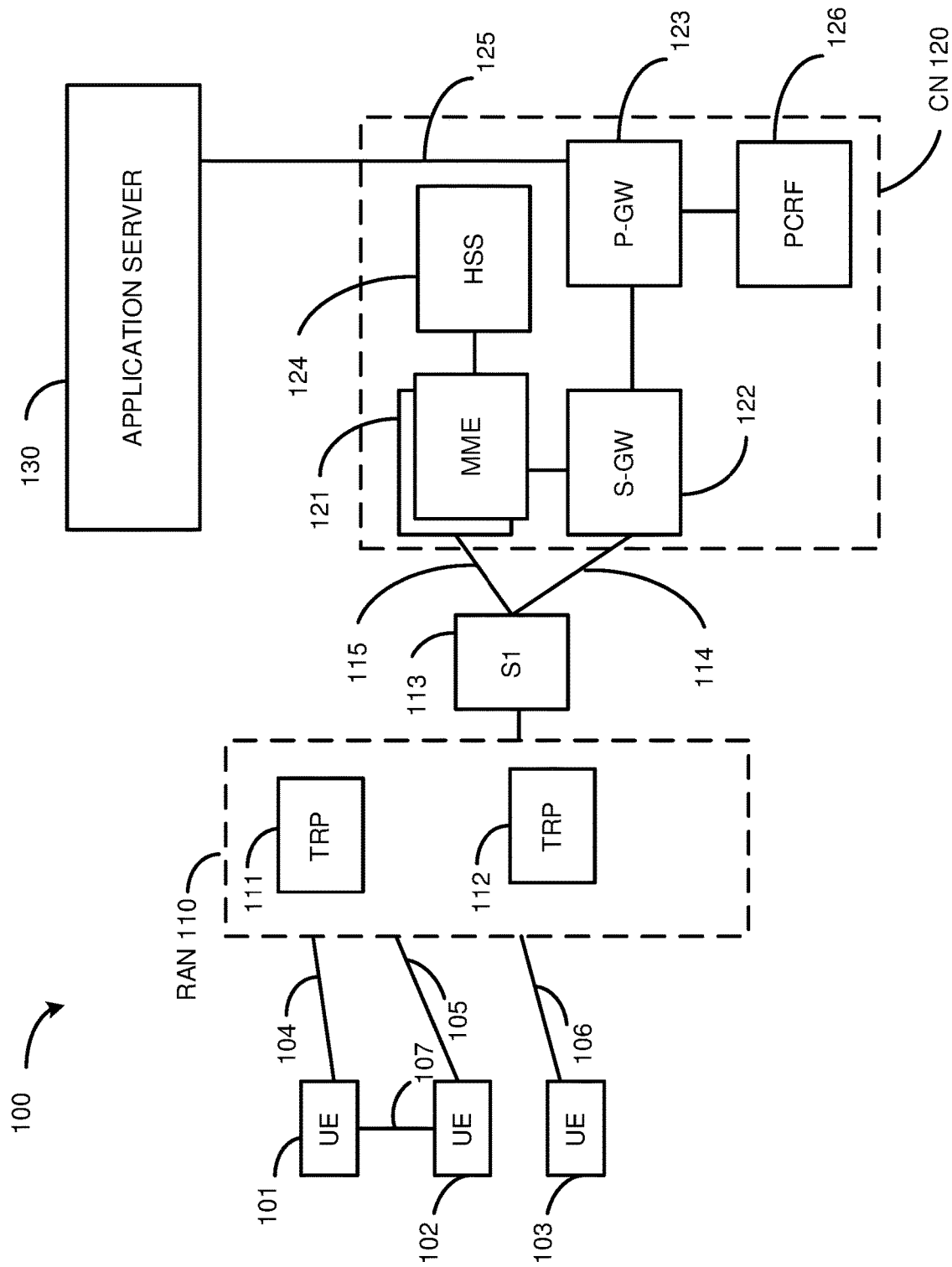
FIG. 1 shows an architecture of a system of a network in accordance with some embodiments of the disclosure.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In a Long Term Evolution (LTE) system, an interference measurement resource (IMR) has been introduced to allow interference measurements on predetermined resources configured for a User Equipment (UE). The IMR in the LTE system is generally based on periodic zero-power channel status information reference signals (ZP CSI-RS).

The IMR may allow the UE to capture interference characteristics. In a fifth generation (5G) or New Radio (NR) system, the ZP CSI-RS could be used as the IMR for the UE in a similar manner with that in the LTE system, especially, for inter-cell interference measurement. It can be easily supported by zero-power transmission (no transmission) on the resource elements (REs) allocated for the interference measurement. Consequently, the UE can utilize the corresponding REs to estimate the inter-cell interference which corresponds to the physical downlink shared channel (PDSCH) transmission of a neighbor Transmission Reception Point (TRP). The approach is considered to be suitable for the conventional inter-cell interference measurement, and causes relatively low overhead.

However, it should be noted that in the scenario of the 5G or NR system supporting Multi-User Multi-Input Multi-Output (MU-MIMO) operations, such a periodic ZP CSI-RS transmission may be inefficient for intra-cell interference measurement. For example, due to dynamic scheduling decisions for MU-MIMO, the intra-cell interference measurement for CSI could be dynamic. For one UE which is measuring interference on one ZP CSI-RS based resource, some other UEs without data transmission at the instance of interference measurement might send data at the instance of scheduled transmission. It may lead to the interference which is not reflected in the result of interference measurement. In this case, the interference measurement based on the semi-statically configured periodic ZP CSI-RS may not be helpful enough to accurately estimate intra-cell interference from different UEs. Thus, the corresponding CSI reporting may not be able to reflect the real channel condition, which degrades the performance of link adaptation.

A possible way of intra-cell interference measurement in the scenario of MU-MIMO is to utilize a UE-specific non-zero-power CSI-RS (NZP CSI-RS) as the IMR, where the TRP can estimate the interference from co-scheduled UEs on the corresponding NZP CSI-RS. That is, the TRP can get interference caused by the combination of any paired UEs with beam-formed CSI-RS transmission.

There might be two ways for the intra-cell interference measurement by using the UE-specific NZP CSI-RS.

The first approach is that the UE acquires the CSI from the serving TRP based on a one-shot CSI-RS transmission. It is assumed that NZP CSI-RS of all scheduled UEs are colliding with each other. The transmitted UE-specific NZP CSI-RS is used for both channel and interference measurements. That is, the UE performs channel estimation and then subtracts the estimation of received desired signal from the whole received signal to accomplish the intra-cell and inter-cell interference measurement. The interference caused by all other paired UEs on the paired UEs' NZP CSI-RSs are accounted as intra-cell interference. In general, the intra-cell interference measurement based on the one-shot CSI-RS transmission requires higher density of NZP CSI-RS according to results of link-level evaluation.

In order to keep the CSI-RS density low, the other approach for the intra-cell interference measurement using NZP CSI-RS is based on channel estimation with the NZP CSI-RS of other UEs and interference emulation. In this approach, a victim UE can use the NZP CSI-RS transmitted to an aggressor UE, to estimate the channel characteristics (denoted as $H_i$) of the victim UE subject to the interference from the aggressor $UE_i$. Then the victim UE can obtain the intra-cell interference from the aggressor $UE_i$ as $R_i = H_i * H_i^H$, where $(\bullet)^H$ is the transpose conjugate operation. Herein, the victim UE may refer to the UE which is subject to the interference from the aggressor UEs, and the aggressor UEs may refer to those UEs which may cause interference to the channel of the victim UE. With this approach, it is possible to construct at the victim UE different possible combinations of the intra-cell interference by combining different $R_i$ from different aggressor $UE_i$. In principle, this approach may not require high density of NZP CSI-RS.

For the intra-cell interference measurement based on channel estimation with the NZP CSI-RS of other UEs and interference emulation, one issue is the overhead, especially when the number of co-scheduled UEs increases.

In order to reduce the overhead, some embodiments of the disclosure provide solutions to utilize beam management reference signals broadcast by the TRP in a cell as the IMR for the intra-cell interference measurement.

FIG. 1 illustrates an architecture of a system 100 of a network in accordance with some embodiments. The system 100 is shown to include a user equipment (UE) 101, a UE 102, and a UE 103. The UEs 101, 102 and 103 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101, 102 and 103 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101, 102 and 103 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101, 102 and 103 utilize connections 104, 105 and 106, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 107. The ProSe interface 107 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The RAN 110 can include one or more Transmission Reception Points (TRPs) 111 and 112 that enable the connections 104, 105 and 106. Any of the TRPs 111 and 112 can be a part of a base station (BS), a NodeB, an evolved NodeB (eNB), a next Generation NodeB (gNB), a RAN node, and so forth, and can comprise ground stations (e.g., terrestrial access points) or satellite stations providing coverage within a geographic area (e.g., a cell). The TRPs 111 and 112 can supports the MU-MIMO operation.

Any of the TRPs 111 and 112 can terminate the air interface protocol and can be the first point of contact for the UEs 101, 102 and 103. In some embodiments, any of the TRPs 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101, 102 and 103 can be configured to communicate using Orthogonal Frequency-Division Multiplexing (OFDM) communication signals with each other or with any of the TRPs 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the TRPs 111 and 112 to the UEs 101, 102 and 103, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101, 102 and 103. The physical downlink control channel (PDCCH) may carry information about the transport format and resource allocations related to the PDSCH channel, among other things. It may also inform the UEs 101, 102 and 103 about the transport format, resource allocation, and H-ARQ (Hybrid Automatic Repeat Request) information related to the uplink shared channel. Typically, downlink scheduling (assigning control and shared channel resource blocks to the UEs within a cell) may be performed at any of the TRPs 111 and 112 based on channel quality information fed back from any of the UEs 101, 102 and 103. The downlink resource assignment information may be sent on the PDCCH used for (e.g., assigned to) each of the UEs 101, 102 and 103.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the TRPs 111 and 112 and the serving gateway (S-GW) 122, and the S1-mobility management entity (MME) interface 115, which is a signaling interface between the TRPs 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-TRP handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101, 102 and 103 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of system 100 may perform one or more functions described as being performed by another one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
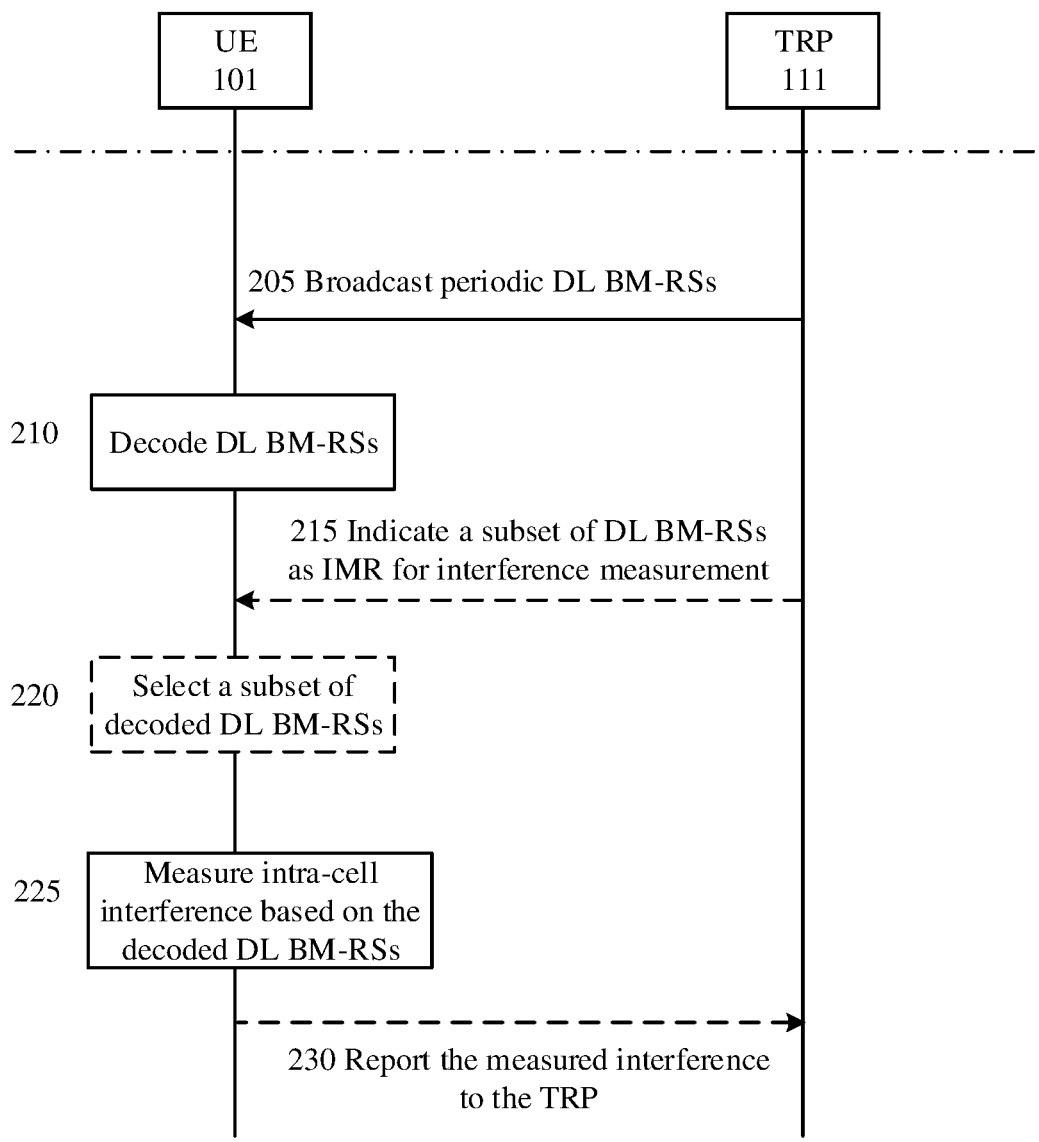
FIG. 2 is a flow chart showing operations for interference measurement based on periodic downlink beam management reference signals (DL BM-RSs) in accordance with some embodiments of the disclosure.

FIG. 2 is a flow chart showing operations for interference measurement based on downlink beam management reference signals (DL BM-RSs) in accordance with some embodiments of the disclosure.

In the 5G or NR system, beam management will be performed at both the TRP side and the UE side to acquire and maintain optimal TRP and UE beams for communication. For downlink transmission, the beam management may include three procedures: P-1, P-2 and P-3. P-1 is to obtain the initial TRP Tx (transmit) beam and UE Rx (receive) beam. P-2 is to enable the TRP Tx beam refinement and P-3 is to enable the UE Rx beam refinement. For downlink beam management procedure P-1, the TRP needs to periodically broadcast beam-formed reference signals to UEs within a cell served by the TRP.

As proposed above, in the scenario of MU-MIMO, it may be suitable for a victim UE to perform the intra-cell interference measurement based on the channel estimation with the NZP CSI-RSs transmitted to aggressor UEs and the interference emulation. However, this approach may cause a large amount of overhead as the number of co-scheduled UEs increases.

In the scenario of MU-MIMO, the DL BM-RSs are periodically broadcast by the TRP to the UEs within a cell in the beam management procedure P-1 for initial beam acquisition. For example, the DL BM-RSs may include a CSI-RS or a Demodulation Reference Signal (DM-RS). Since the CSI-RS for the beam management procedure P-1 is beam-formed and periodically transmitted to the UE, which is non-zero power based, the CSI-RS for the beam management procedure P-1 can be also utilized as a periodic IMR based on NZP CSI-RS. That is, the intra-cell interference measurement can be realized by using the periodic NZP CSI-RS broadcast by the TRP during the beam management procedure P-1. In this way, the overhead for the intra-cell interference measurement can be reduced since it is not necessary to allocate a separate CSI-RS for the purpose of intra-cell interference measurement.

With the NZP CSI-RSs for the beam management procedure P-1, the intra-cell interference measurement based on the channel estimation and the interference emulation could be simplified because the NZP CSI-RSs transmitted to the respective aggressor UEs have been known to the victim UE. For MU-MIMO operations, the TRP can indicate to the victim UE the interference from which aggressor UEs should be measured, or in other words, which NZP CSI-RSs should be measured. The victim UE will measure the interference based on the NZP CSI-RSs sent to the respective aggressor UEs and feedback the interference measurement result to the TRP. The indication of the NZP CSI-RSs to be measured for interference is UE specific and could be dynamically changed. If no NZP CSI-RS is indicated, then the victim UE should not perform the interference measurement based on the periodic NZP CSI-RSs. Otherwise, the UE should perform the interference measurement based on the corresponding NZP CSI-RSs as indicated.

Specifically, at 205, the TRP 111 may broadcast periodic BM-RSs to the UEs in the cell. The periodic BM-RSs are to be utilized by the TRP 111 during the beam management procedure P-1 to perform an initial beam acquisition for respective UEs in the cell.

At 210, the UE 101 may decode the periodic BM-RSs received from the TRP 111 so as to facilitate the TRP 111 to realize the initial beam acquisition.

Meanwhile, according to some embodiments, these periodic BM-RSs may be also utilized as the IMR for the UE 101 to perform the intra-cell interference measurement.

Accordingly, at 225, the UE 101 may measure the intra-cell interference from other UEs in the cell based on the decoded periodic BM-RSs. For example, the periodic BM-RSs may include periodic NZP CSI-RSs.

In order to keep the low density of the CSI-RSs for interference measurement, the intra-cell interference of the victim UE (e.g. the UE 101) may be measured based on the channel estimation with the NZP CSI-RSs of one or more aggressor UEs and the interference emulation as described above.

Specifically, the UE 101 can use the NZP CSI-RS transmitted to an aggressor UE, to estimate the channel characteristics (denoted as $H_i$) of the UE 101 subject to the interference from the aggressor $UE_i$. Then the UE 101 can obtain the intra-cell interference from the aggressor $UE_i$ as $R_i = H_i * H_i^H$, where $(\cdot)^H$ is the transpose conjugate operation.

Then at 230, the UE 101 may report the measured interference from each aggressor $UE_i$, i.e. $R_i$, to the TRP 111. The TRP 111 may perform the interference emulation for any combination of aggressor UEs and then determine appropriate approaches to handle the interference. Alternatively, the interference emulation may be performed at the UE side. In this case, the UE 101 may generate an interference report including the measured interference of a certain combination of one or more aggressor UEs and send the interference report to the TRP.

Since there may be only some of the other UEs in the cell that may cause remarkable interference to the victim UE, the victim UE may select a subset of the other UEs in the cell as the aggressor UEs to measure the intra-cell interference or the TRP may indicate the victim UE to select a subset of the other UEs in the cell as the aggressor UEs to measure the intra-cell interference. Accordingly, the victim UE may select a respective subset of the decoded BM-RSs as the IMR to measure the intra-cell interference from the selected subset of the other UEs in the cell.

As shown in FIG. 2, before measuring the intra-cell interference, at 220, the UE 101 may select a subset of the decoded BM-RSs corresponding to the selected subset of the other UEs in the cell so as to measure the intra-cell interference from the selected subset of the other UEs in the cell.

In some embodiments, the UE 101 may determine the interference from which of the other UEs in the cell should be measured and thus determine which of the decoded BM-RSs should be utilized as the IMR for the intra-cell interference measurement, based on the desire of the UE 101 itself.

In some embodiments, the UE 101 may select the subset of the decoded BM-RSs for the intra-cell interference measurement according to an indication from the TRP 111. For example, as illustrated in FIG. 2, at 215, the TRP 111 may encode an indication and transmit the encoded indication to the UE 101 to indicate the interference from which of the other UEs in the cell should be measured. Since each UE in the cell has a corresponding beam management reference signal specific to the UE, the indication from the TRP is actually to indicate which BM-RSs should be utilized as the IMR to measure the intra-cell interference of the UE. Then according to the indication from the TRP, the UE 101 may select a subset of the decoded BM-RSs to measure the intra-cell interference from a respective subset of the other UEs in the cell. In some embodiments, the indication may be UE specific and may be dynamically configured by the TRP 111 via higher layer signaling or downlink control information (DCI).

With the operations in the flow chart of FIG. 2, it is possible to measure, at the victim UE, the intra-cell interference from different possible combinations of the aggressor UEs as indicated by the TRP 111 by combining the obtained different interference $R_i$ from each different aggressor $UE_i$.

Figure 3:
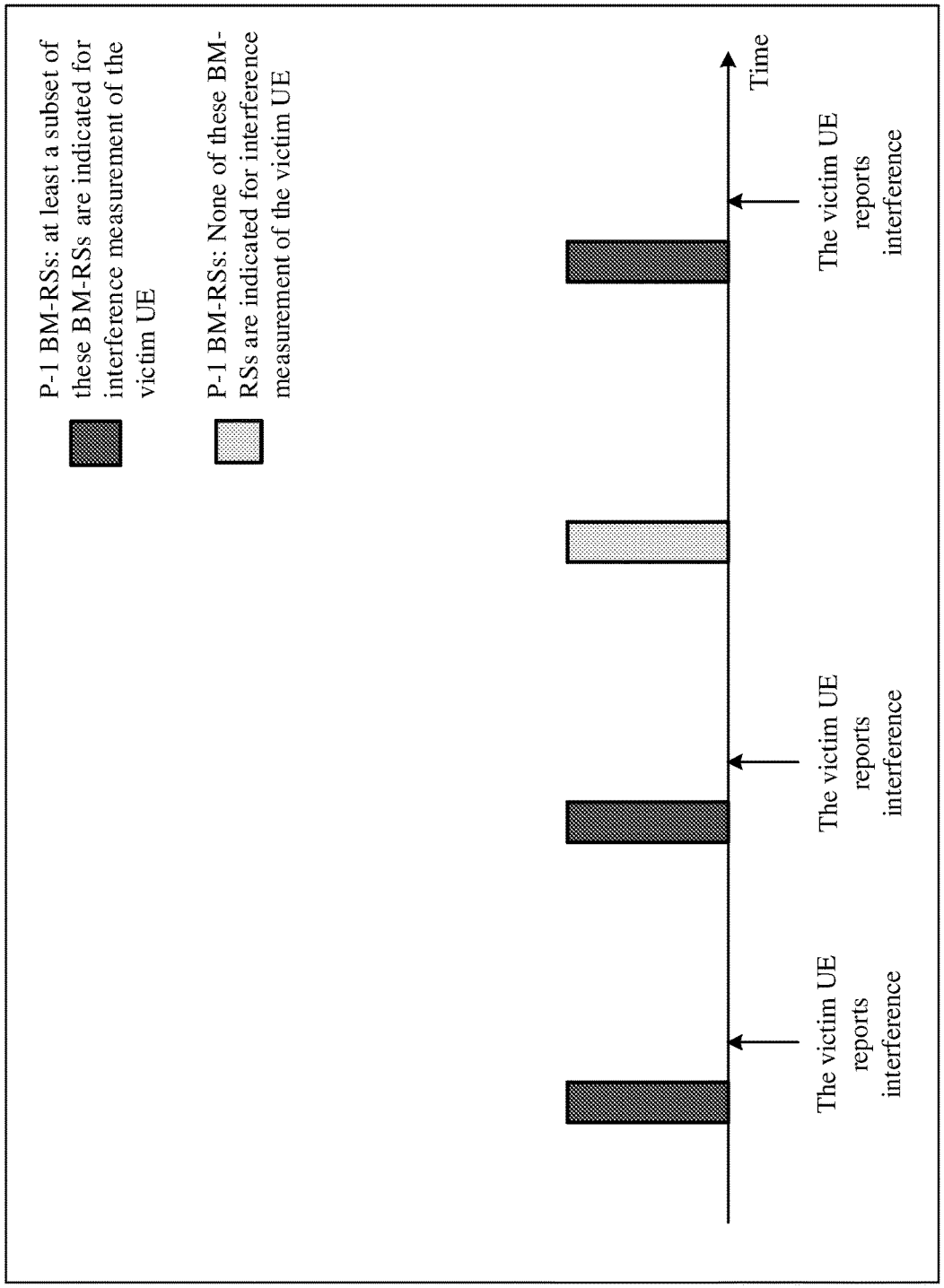
FIG. 3 shows an example time chart of interference measurement and report based on periodic DL BM-RSs in accordance with some embodiments of the disclosure.

FIG. 3 shows an example time chart of interference measurement and report based on periodic DL BM-RSs in accordance with some embodiments of the disclosure. As illustrated in the figure, the BM-RSs are periodically broadcast by the TRP to the UEs in the cell. If the victim UE receives an indication from the TRP for indicating the subset of the BM-RSs for the intra-cell interference measurement, the victim UE should perform the intra-cell interference measurement based on the subset of the BM-RSs and report the measured interference to the TRP periodically. Otherwise, if no BM-RSs are indicated for the intra-cell interference measurement, the UE should not perform the intra-cell interference measurement based on the periodic BM-RSs.

Since the reference signals for the beam management procedure P-1 are periodically broadcast to the UEs in the cell, the intra-cell interference measurement based on the P-1 BM-RSs is performed periodically and the interference report is sent to the TRP periodically. In some embodiments of the disclosure, the victim UE may conduct the intra-cell interference measurement based on semi-persistent downlink beam management reference signals instead of periodic DL BM-RSs for improved flexibility.

Figure 4:
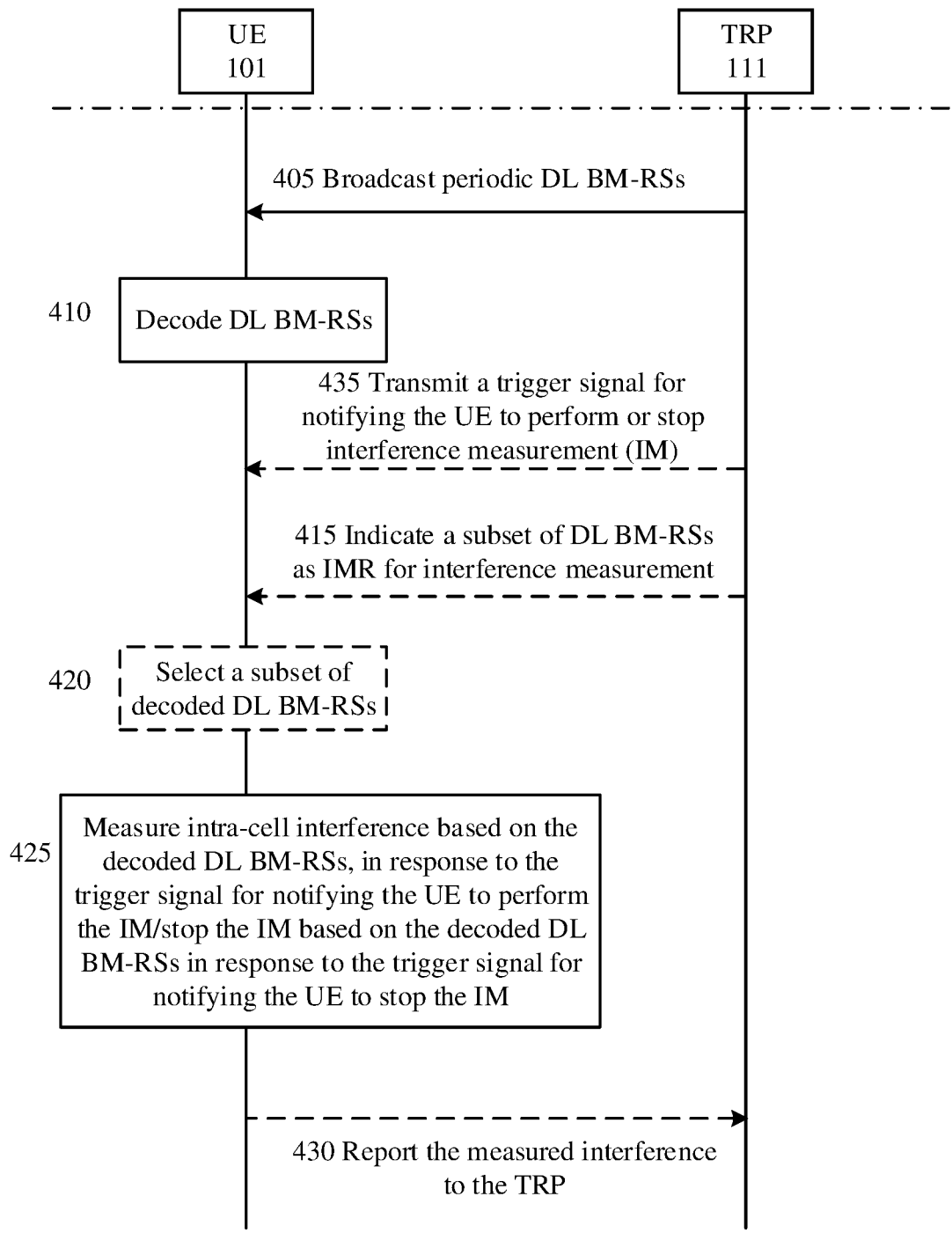
FIG. 4 is a flow chart showing operations for interference measurement based on semi-persistent DL BM-RSs in accordance with some embodiments of the disclosure.

FIG. 4 is a flow chart showing operations for interference measurement based on semi-persistent DL BM-RSs in accordance with some embodiments of the disclosure. The operations 405, 410, 415, 420 and 430 in the flow chart of FIG. 4 are the same as the operations 205, 210, 215, 220 and 230 in the flow chart of FIG. 2, and thus the detailed description related to these operations will be omitted for conciseness. Different from the interference measurement based on periodic BM-RSs of FIG. 2, in FIG. 4, the TRP 111 can control the UE 101 to perform or stop the interference measurement by encoding a trigger signal and transmitting the encoded trigger signal to the UE 101 at 435. Accordingly, at 425, the UE 101 may measure the intra-cell interference based on the BM-RSs in response to the trigger signal for notifying the UE 101 to perform the interference measurement or stop the intra-cell interference measurement in response to the trigger signal for notifying the UE 101 to stop the interference measurement. In this case, the periodic BM-RSs for the beam management procedure P-1 are semi-persistently utilized as the IMR for the victim UE to perform the intra-cell interference measurement more flexibly.

Figure 5:
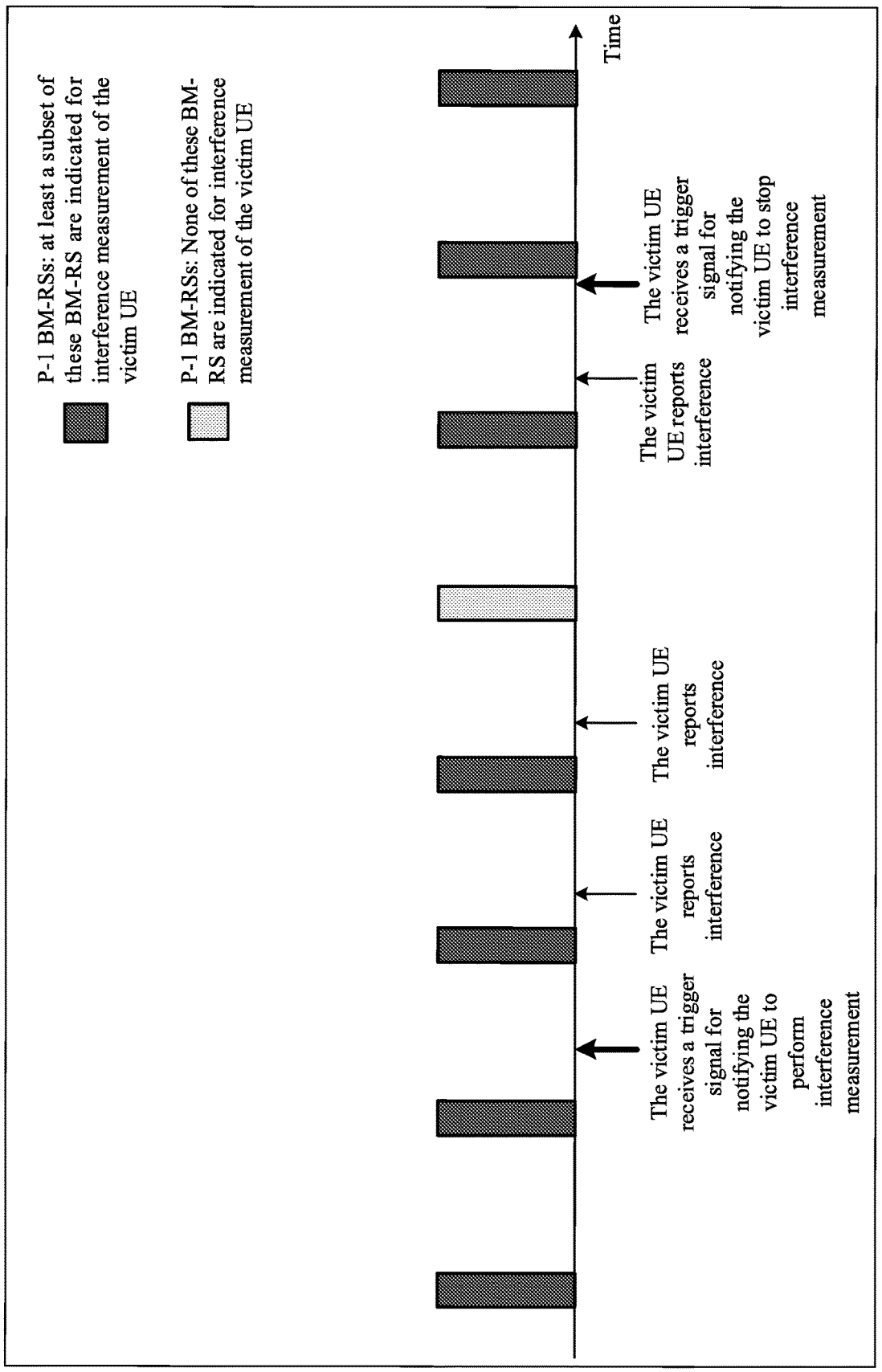
FIG. 5 shows an example time chart of interference measurement and report based on semi-persistent DL BM-RSs in accordance with some embodiments of the disclosure.

FIG. 5 shows an example time chart of interference measurement and report based on semi-persistent DL BM-RSs in accordance with some embodiments of the disclosure. As illustrated in the figure, the victim UE may perform or stop the interference measurement based on the periodic P-1 BM-RSs in response to receiving a trigger signal for notifying the victim UE to perform or stop the interference measurement.

Another way to improve the flexibility of the intra-cell interference measurement is to utilize BM-RSs for the beam management procedure P-2 as the IMR for the intra-cell interference measurement of the victim UE. The beam management procedure P-2 is to refine the TRP Tx beam for downlink transmission. During the procedure P-2, the TRP sends beam management reference signals (e.g. CSI-RS) to be measured by the UE and the UE needs to feedback the received signals to complete the beam refinement. The procedure P-2 may be performed aperiodically. In other words, the TRP may broadcast aperiodic BM-RSs to the UE during the procedure P-2. Similar to the P-1 periodic BM-RSs for the intra-cell interference measurement, the aperiodic BM-RSs can also be reused as the IMR for the UE to perform the intra-cell interference measurement.

Figure 6:
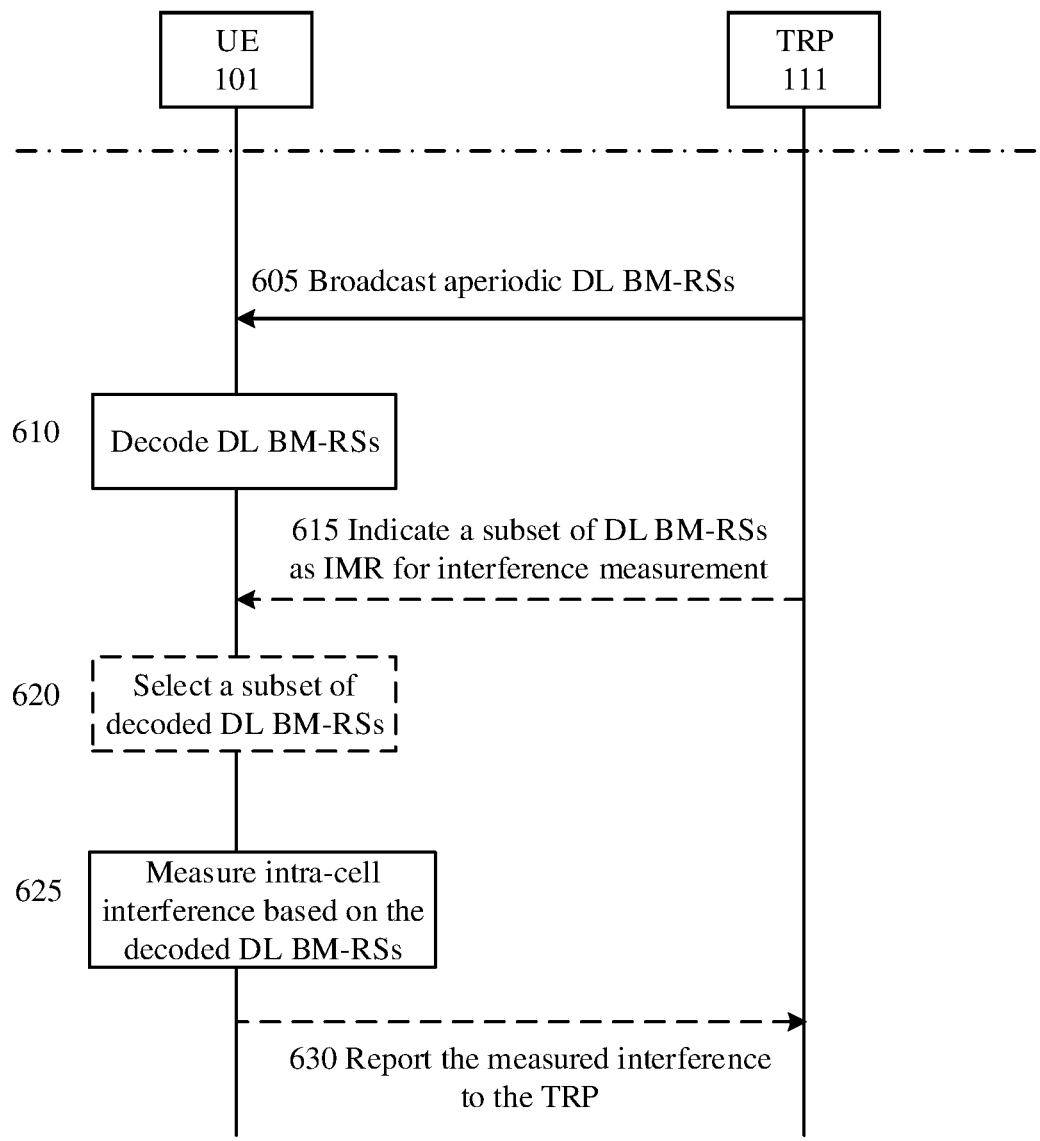
FIG. 6 is a flow chart showing operations for interference measurement based on aperiodic DL BM-RSs in accordance with some embodiments of the disclosure.

FIG. 6 is a flow chart showing operations for interference measurement based on aperiodic downlink beam management reference signals in accordance with some embodiments of the disclosure. The operations in the flow chart of FIG. 6 are similar to the operations in the flow chart of FIG. 2, except that the P-2 aperiodic BM-RSs instead of the P-1 periodic BM-RSs are utilized as the IMR for intra-cell interference measurement. Thus the detailed description related to the operations in FIG. 6 will be omitted for conciseness.

Figure 7:
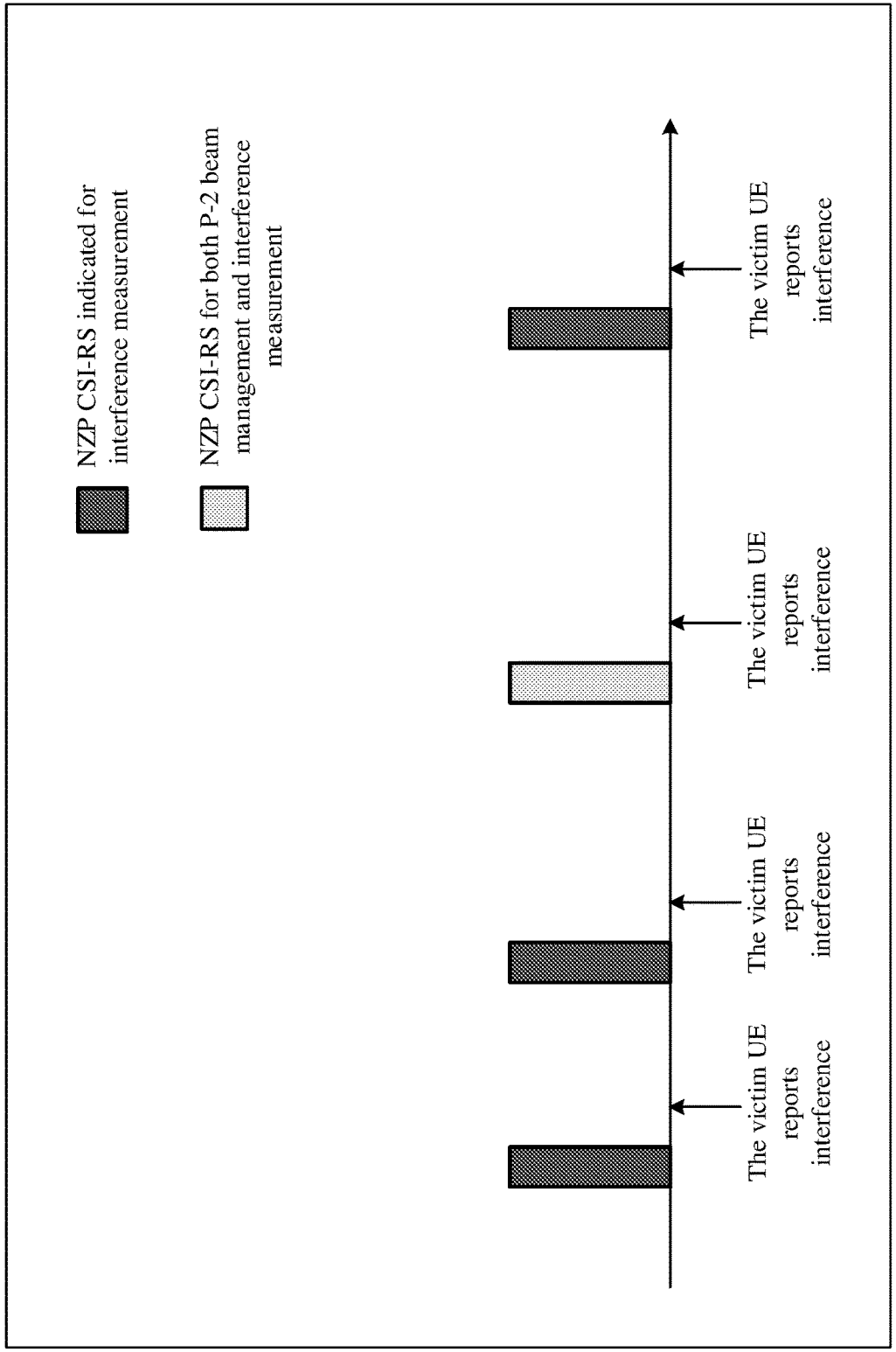
FIG. 7 shows an example time chart of interference measurement and report based on aperiodic DL BM-RSs in accordance with some embodiments of the disclosure.

Since the intra-cell interference is to be measured based on the P-2 aperiodic BM-RSs, the UE can report the intra-cell interference aperiodically. For example, the UE can measure and report the intra-cell interference in response to a trigger signal configured by the TRP for triggering the interference measurement. FIG. 7 shows an example time chart of interference measurement and report based on aperiodic BM-RSs in accordance with some embodiments of the disclosure. As shown in the figure, the aperiodic NZP CSI-RSs for the P-2 beam management procedure may be also indicated as the aperiodic IMR for the intra-cell interference measurement. In this way, the flexibility of the intra-cell interference can be further increased, and the overhead for the intra-cell interference can be reduced.

In addition to the intra-cell interference as discussed above, the UE may be subject to interference from other UEs in a neighbor cell, especially when the UE and the TRP are working in a dynamic Time Division Duplexing (TDD) mode. In the dynamic TDD mode, a downlink transmission of a UE in a cell may be subject to interference from an uplink transmission of other UEs in a neighbor cell. Sometimes the interference from the other UEs in the neighbor cell may be more significant than the intra-cell interference of the UE. Thus in order to estimate the channel status information of the UE in the dynamic TDD mode more accurately, it may be necessary to measure the interference from the other UEs in the neighbor cell.

In the 5G or NR system supporting MU-MIMO operations, UL beam management has been considered to maintain a good UE-TRP beam pair. For the UEs with beam correspondence, the UEs could directly reuse the DL Rx beam to be the UL Tx beam. However, for those without beam correspondence, some uplink beam sweeping operations should be used to help the UEs to determine the best UL Tx beam. Further in the TRP side, without beam correspondence, the TRP cannot easily determine which beam is to be used to receive the UL signal. Hence the UL beam management are to be supported for the case when partial or no beam correspondence can be guaranteed.

Similar to the DL beam management, UL beam management reference signals are used to perform the UL beam management. Likewise, the UL beam management reference signals transmitted by the other UEs in the neighbor cell can also be utilized as the IMR for the UE to measure the interference from the other UEs in the neighbor cell.

Figure 8:
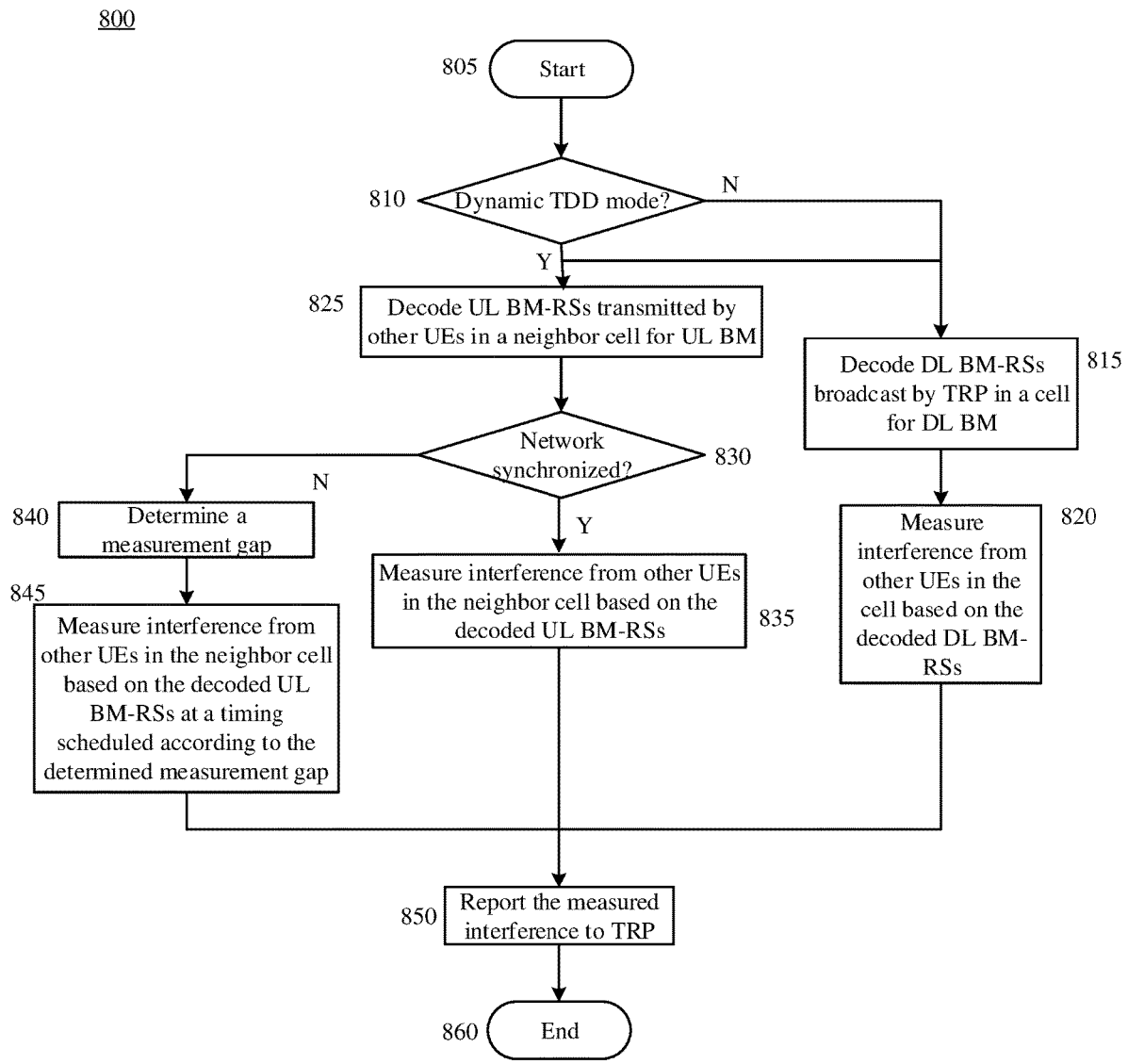
FIG. 8 is a flow chart showing operations for interference measurement based on both uplink beam management reference signals (UL BM-RSs) and DL BM-RSs in accordance with some embodiments of the disclosure.

In some embodiments, it is proposed to measure interference by reusing both uplink beam management reference signals and downlink beam management reference signals as the IMR of the UE 101. FIG. 8 is a flow chart showing operations at the UE 101 for interference measurement based on both uplink beam management reference signals (UL BM-RSs) and DL BM-RSs in accordance with some embodiments of the disclosure.

At 810, it may be determined whether the UE 101 and the TRP 111 are operating in the dynamic TDD mode. If they are not operating in the dynamic TDD mode, the UE 101 may just measure the intra-cell interference from other UEs in a same cell based on DL BM-RSs as described above. Specifically, the UE 101 may decode the DL BM-RSs broadcast by the TRP 111 for DL beam management at 815 and then measure the intra-cell interference from other UEs in the same cell based on the decoded DL BM-RSs at 820. For the details of the operations 815 and 820, references may be made to the description about the foregoing embodiments as shown in FIG. 2 to FIG. 7.

If the UE 101 and the TRP 111 are operating in the dynamic TDD mode, the interference from other UEs in the neighbor cell may be a main interference source and thus need to be measured so as to accurately estimate the total interference. Thus, at 825, the UE 101 may decode UL BM-RSs transmitted by other UEs in the neighbor cell for UL beam management. As an example, the UL BM-RSs may include a Sounding Reference Signal (SRS), a Physical Uplink Control Chanel (PUCCH) signal or a Physical Random Access Chanel (PRACH) signal. Then, the UE 101 may utilize the decoded UL BM-RSs as the IMR to measure the interference from the other UEs in the neighbor cell.

In order to accurately measure the total interference on the UE 101 from the other UEs in the same cell and the other UEs in the neighbor cell, an issue regarding the synchronization of the network (e.g. RAN 110) should be taken into account. If the network is synchronized, i.e. the cell and the neighbor cell is synchronized, the UE 101 can measure the interference from the other UEs in the neighbor cell with the UL DM-RSs as the IMR at 835 at a same timing as that of measuring the intra-cell interference from the other UEs in the cell based on the DL DM-RSs. Otherwise, if the network is not synchronized, i.e. the cell and the neighbor cell is not synchronized, a measurement gap may be determined at 840 based on a timing difference between the cell and the neighbor cell. Here, the measurement gap is a gap between a timing of measuring the interference from the other UEs in the cell and a timing of measuring the interference from the other UEs in the neighbor cell. Then the UE 101 may measure the interference from the other UEs in the neighbor cell based on the decoded UL BM-RSs at a timing scheduled according to the determined measurement gap and the timing of measuring the interference from the other UEs in the cell at 845.

In this way, in the dynamic TDD mode, both the interference from the other UEs in the cell and the interference from the other UEs in the neighbor cell can be measured with the DL BM-RSs and the UL BM-RSs respectively. As a result, the UE 101 can report both the interference from the other UEs in the cell and the interference from the other UEs in the neighbor cell to the TRP 111 at 850.

Figure 9:
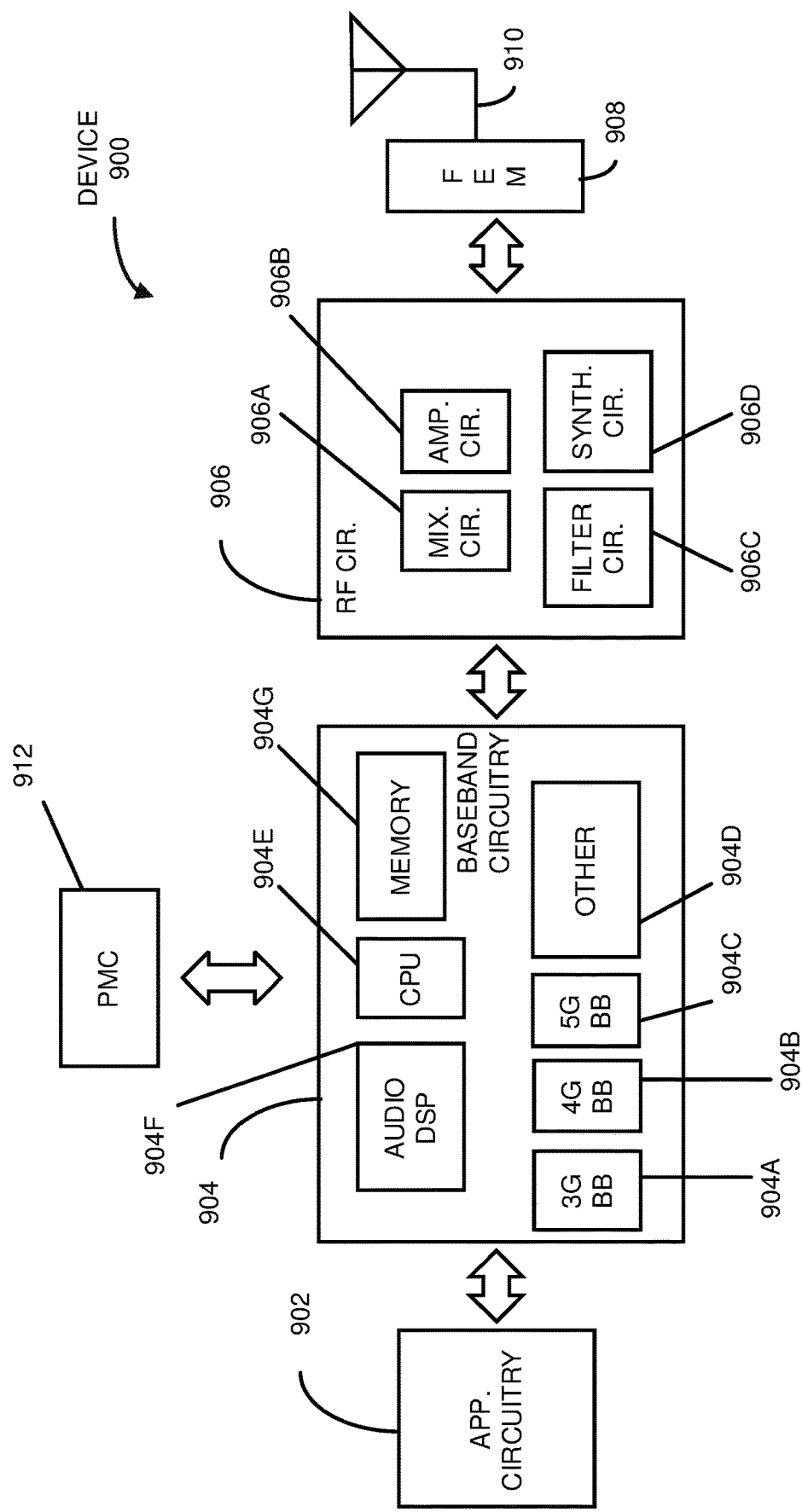
FIG. 9 illustrates example components of a device in accordance with some embodiments of the disclosure.

Embodiments described herein may be implemented into a device using any suitably configured hardware and/or software. FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a TRP. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc.

In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c.

In some embodiments, the mixer circuitry 906a of the receive signal path and the mixer circuitry 906a of the transmit signal path may include two or more mixers and may be arranged for quadrature down-conversion and up-conversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down-conversion and direct up-conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, in order to receive data, it may transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
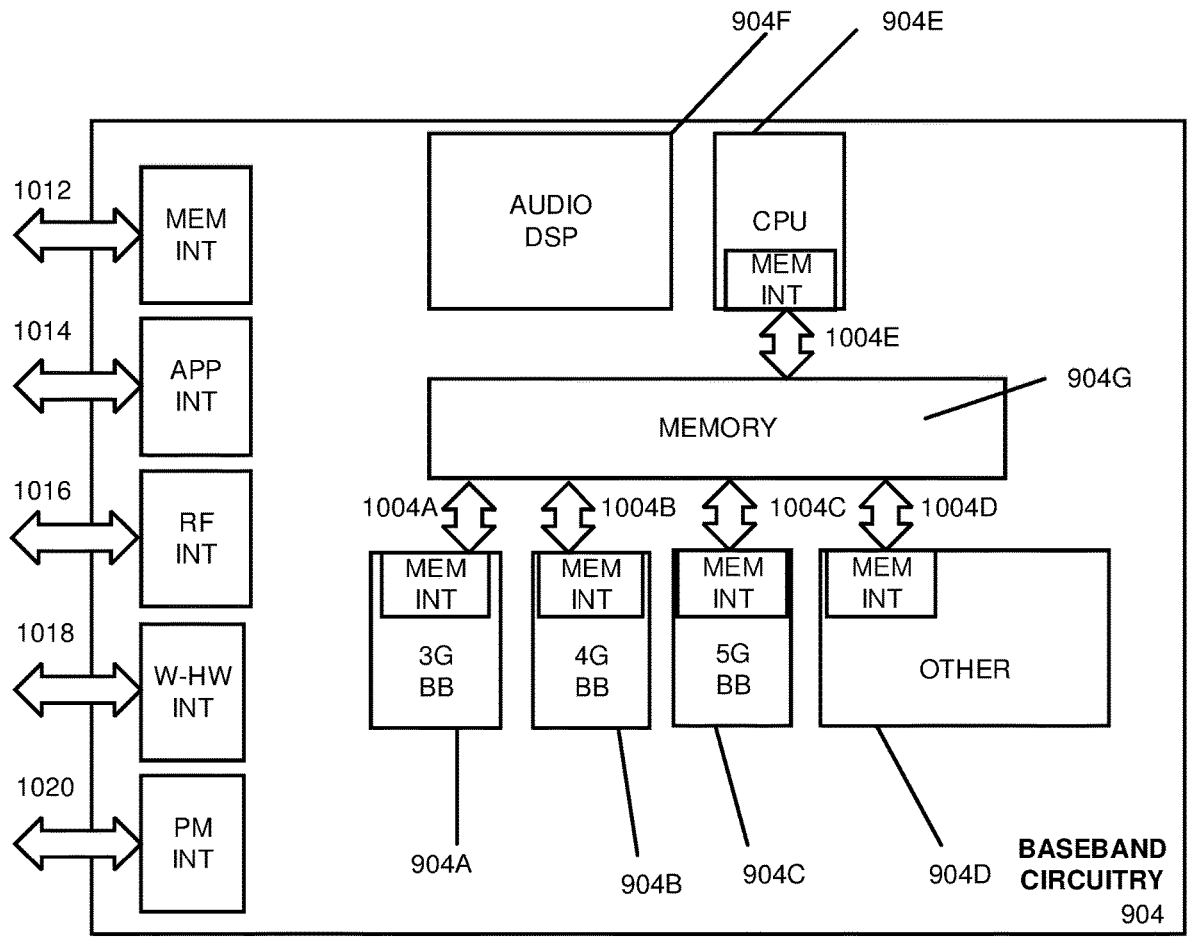
FIG. 10 illustrates example interfaces of baseband circuitry in accordance with some embodiments of the disclosure.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
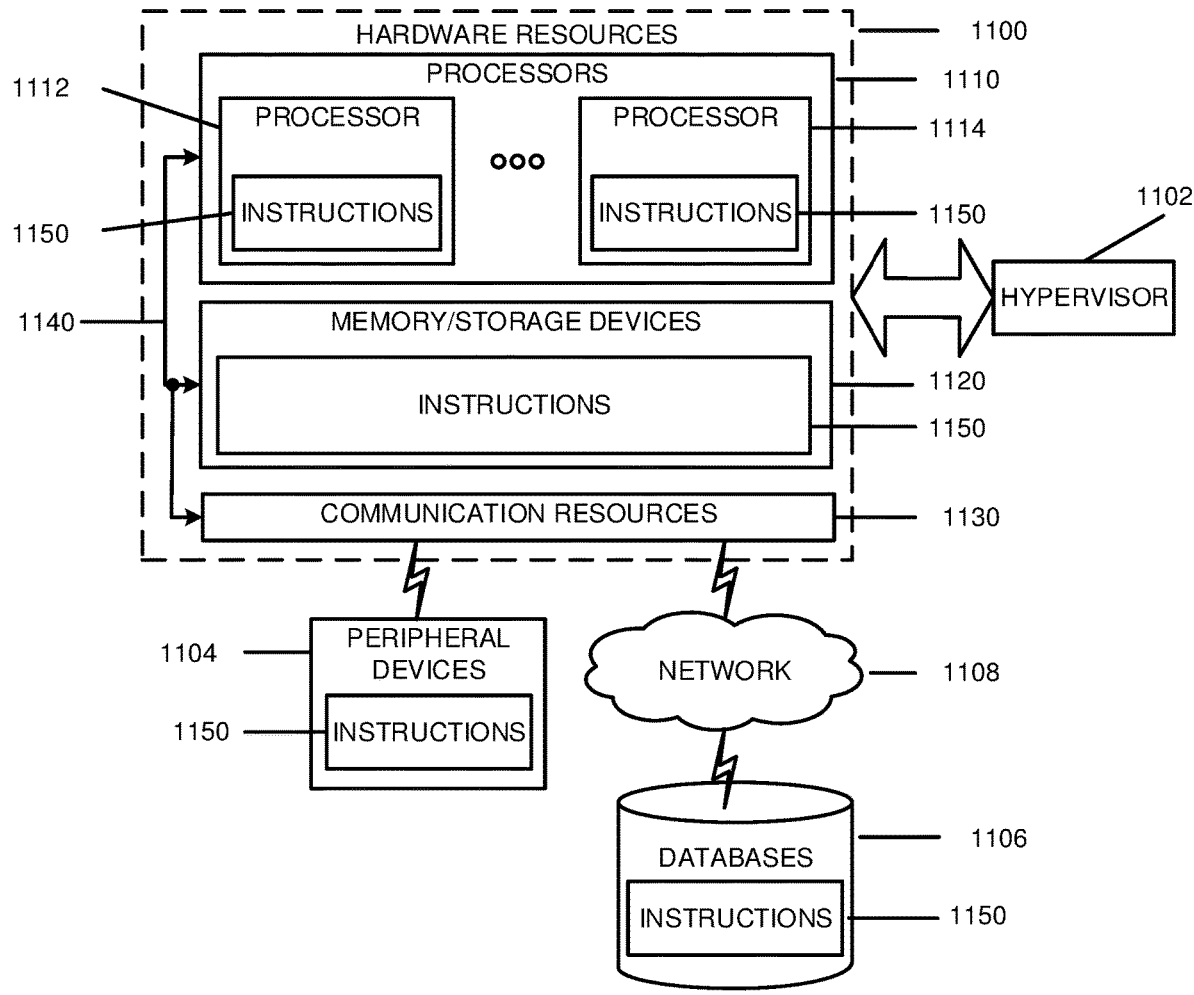
FIG. 11 is a block diagram illustrating components, according to some example embodiments of the disclosure, able to read instructions from a machine-readable or computer-readable medium and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

The following paragraphs describe examples of various embodiments.

Example 1 includes an apparatus for a User Equipment (UE), including circuitry configured to: decode one or more beam management reference signals broadcasted by a Transmission Reception Point (TRP) in a cell, wherein the one or more beam management reference signals are used by the TRP to perform beam management for respective one or more other UEs in the cell; and measure interference from the one or more other UEs in the cell based on the decoded one or more beam management reference signals.

Example 2 includes the apparatus of Example 1, wherein the circuitry is further configured to select a subset of the decoded one or more beam management reference signals as interference measurement resource (IMR) to measure interference from a respective subset of the one or more other UEs based on the selected subset of the decoded one or more beam management reference signals.

Example 3 includes the apparatus of Example 2, wherein the circuitry is further configured to: decode an indication received from the TRP for indicating the subset of the decoded one or more beam management reference signals as the IMR; and select the subset of the decoded one or more beam management reference signals as the IMR according to the indication from the TRP.

Example 4 includes the apparatus of Example 3, wherein the indication is to be dynamically configured by the TRP via higher layer signaling or downlink control information (DCI).

Example 5 includes the apparatus of any of Examples 2-4, wherein the circuitry is further configured to report the measured interference from each of the respective subset of the one or more other UEs to the TRP.

Example 6 includes the apparatus of any of Examples 2-4, wherein the circuitry is further configured to: generate an interference report including the measured interference from each of the respective subset of the one or more other UEs; and send the interference report to the TRP.

Example 7 includes the apparatus of any of Examples 1-6, wherein the circuitry is further configured to: perform a channel estimation for the UE based on a beam management reference signal specific to a respective other UE of the one or more other UEs to get an estimated channel characteristic H of the UE subject to interference from the respective other UE; and obtain the interference from the respective other UE as $R=H*H^H$.

Example 8 includes the apparatus of any of Examples 1-7, wherein the one or more beam management reference signals include one or more periodic beam management reference signals broadcasted by the TRP to perform an initial beam acquisition for the respective one or more other UEs in the cell.

Example 9 includes the apparatus of any of Examples 1-7, wherein the one or more beam management reference signals include one or more aperiodic beam management reference signals broadcasted by the TRP to perform a TRP transmission beam refinement for the respective one or more other UEs in the cell.

Example 10 includes the apparatus of Example 8, wherein the circuitry is further configured to: measure the interference from the one or more other UEs in the cell based on the one or more periodic beam management reference signals, in response to a trigger signal from the TRP for notifying the UE to perform the interference measurement; and stop measuring the interference from the one or more other UEs in the cell based on the one or more periodic beam management reference signals, in response to a trigger signal from the TRP for notifying the UE to stop the interference measurement.

Example 11 includes the apparatus of any of Examples 1-10, wherein the one or more beam management reference signals include a Zero Power Channel Status Information Reference Signal (ZP CSI-RS), a Non-zero Power Channel Status Information Reference Signal (NZP CSI-RS) or a Demodulation Reference Signal (DM-RS).

Example 12 includes the apparatus of any of Examples 1-11, wherein the TRP is a part of an evolved node B (eNB) or a next Generation NodeB (gNB).

Example 13 includes the apparatus of any of Examples 1-5 and 7-12, wherein when the UE and the TRP operate in a dynamic Time Division Duplexing (TDD) mode, the circuitry is further configured to: decode one or more uplink beam management reference signals transmitted respectively by one or more other UEs in a neighbor cell for uplink beam management; and measure interference from the one or more other UEs in the neighbor cell based on the decoded one or more uplink beam management reference signals.

Example 14 includes the apparatus of Example 13, wherein the one or more uplink beam management reference signals include a Sounding Reference Signal (SRS), a Physical Uplink Control Chanel (PUCCH) signal or a Physical Random Access Chanel (PRACH) signal.

Example 15 includes the apparatus of Example 13 or 14, wherein when the cell and the neighbor cell are not synchronized, the circuitry is further configured to: determine a measurement gap based on a timing difference between the cell and the neighbor cell; and measure the interference from the one or more other UEs in the neighbor cell at a timing scheduled according to the determined measurement gap and a timing of measuring the interference from the one or more other UEs in the cell.

Example 16 includes the apparatus of any of Examples 13-15, wherein the circuitry is further configured to: generate an interference report including both the measured interference from the one or more other UEs in the cell and the measured interference from the one or more other UEs in the neighbor cell; and send the interference report to the TRP.

Example 17 includes an apparatus for a User Equipment (UE), including circuitry configured to: decode one or more uplink beam management reference signals transmitted respectively by one or more other UEs in a neighbor cell for uplink beam management; and measure interference from the one or more other UEs in the neighbor cell based on the decoded one or more uplink beam management reference signals.

Example 18 includes the apparatus of Example 17, wherein the one or more uplink beam management reference signals include a Sounding Reference Signal (SRS), a Physical Uplink Control Chanel (PUCCH) signal or a Physical Random Access Chanel (PRACH) signal.

Example 19 includes the apparatus of Example 17, wherein the UE operates in a dynamic Time Division Duplexing (TDD) mode.

Example 20 includes an apparatus for a Transmission Reception Point (TRP), including circuitry configured to: broadcast one or more beam management reference signals to one or more User Equipments (UEs) in a cell to perform beam management for the one or more UEs; and encode an indication to be transmitted to an UE in the cell for indicating a subset of the one or more beam management reference signals as interference measurement resource (IMR) for the UE to measure interference from a respective subset of one or more other UEs in the cell.

Example 21 includes the apparatus of Example 20, wherein the circuitry is further configured to receive, from the UE, the measured interference from each of the respective subset of the one or more other UEs in the cell.

Example 22 includes the apparatus of Example 20, wherein the circuitry is further configured to receive, from the UE, an interference report including the measured interference from each of the respective subset of the one or more other UEs in the cell.

Example 23 includes the apparatus of any of Examples 20-22, wherein the circuitry is further configured to dynamically configure the indication via higher layer signaling or downlink control information (DCI).

Example 24 includes the apparatus of any of Examples 20-23, wherein the one or more beam management reference signals include one or more periodic beam management reference signals broadcasted by the TRP to perform an initial beam acquisition for the one or more UEs in the cell.

Example 25 includes the apparatus of any of Examples 20-23, wherein the one or more beam management reference signals include one or more aperiodic beam management reference signals broadcasted by the TRP to perform a TRP transmission beam refinement for the one or more UEs in the cell.

Example 26 includes the apparatus of Example 24, wherein the circuitry is further configured to encode a trigger signal to be transmitted to the UE for notifying the UE to perform the interference measurement based on the one or more periodic beam management reference signals or stop the interference measurement based on the one or more periodic beam management reference signals.

Example 27 includes the apparatus of any of Examples 20-26, wherein the one or more beam management reference signals include a Zero Power Channel Status Information Reference Signal (ZP CSI-RS), a Non-zero Power Channel Status Information Reference Signal (NZP CSI-RS) or a Demodulation Reference Signal (DM-RS).

Example 28 includes the apparatus of any of Examples 20-27, wherein the TRP is a part of an evolved node B (eNB) or a next Generation NodeB (gNB).

Example 29 includes the apparatus of any of Examples 20, 21 and 23-28, wherein when the UE and the TRP operate in a dynamic Time Division Duplexing (TDD) mode, the circuitry is further configured to: receive, from the UE, an interference report including both the interference from the one or more other UEs in the cell and interference from one or more other UEs in a neighbor cell, wherein the interference from the one or more other UEs in the neighbor cell is measured by the UE based on one or more uplink beam management reference signals transmitted respectively by the one or more other UEs in the neighbor cell for uplink beam management.

Example 30 includes the apparatus of Example 29, wherein the one or more uplink beam management reference signals include a Sounding Reference Signal (SRS), a Physical Uplink Control Chanel (PUCCH) signal or a Physical Random Access Chanel (PRACH) signal.

Example 31 includes the apparatus of Example 29 or 30, wherein when the cell and the neighbor cell are not synchronized, the circuitry is further configured to: determine a measurement gap based on a timing difference between the cell and the neighbor cell; and indicate the UE to measure the interference from the one or more other UEs in the neighbor cell at a timing scheduled according to the determined measurement gap and a timing of measuring the interference from the one or more other UEs in the cell.

Example 32 includes a method performed at a User Equipment (UE), including: decoding one or more beam management reference signals broadcasted by a Transmission Reception Point (TRP) in a cell, wherein the one or more beam management reference signals are used by the TRP to perform beam management for respective one or more other UEs in the cell; and measuring interference from the one or more other UEs in the cell based on the decoded one or more beam management reference signals.

Example 33 includes the method of Example 32, wherein the method further includes selecting a subset of the decoded one or more beam management reference signals as interference measurement resource (IMR) to measure interference from a respective subset of the one or more other UEs based on the selected subset of the decoded one or more beam management reference signals.

Example 34 includes the method of Example 33, wherein the method further includes: decoding an indication received from the TRP for indicating the subset of the decoded one or more beam management reference signals as the IMR; and selecting the subset of the decoded one or more beam management reference signals as the IMR according to the indication from the TRP.

Example 35 includes the method of Example 34, wherein the indication is to be dynamically configured by the TRP via higher layer signaling or downlink control information (DCI).

Example 36 includes the method of any of Examples 33-35, wherein the method further includes reporting the measured interference from each of the respective subset of the one or more other UEs to the TRP.

Example 37 includes the method of any of Examples 33-35, wherein the method further includes generating an interference report including the measured interference from each of the respective subset of the one or more other UEs; and sending the interference report to the TRP.

Example 38 includes the method of any of Examples 32-37, wherein the method further includes: performing a channel estimation for the UE based on a beam management reference signal specific to a respective other UE of the one or more other UEs to get an estimated channel characteristic H of the UE subject to interference from the respective other UE; and obtain the interference from the respective other UE as $R=H*H^H$.

Example 39 includes the method of any of Examples 32-38, wherein the one or more beam management reference signals include one or more periodic beam management reference signals broadcasted by the TRP to perform an initial beam acquisition for the respective one or more other UEs in the cell.

Example 40 includes the method of any of Examples 32-38, wherein the one or more beam management reference signals include one or more aperiodic beam management reference signals broadcasted by the TRP to perform a TRP transmission beam refinement for the respective one or more other UEs in the cell.

Example 41 includes the method of Example 39, wherein the method further includes: measuring the interference from the one or more other UEs in the cell based on the one or more periodic beam management reference signals, in response to a trigger signal from the TRP for notifying the UE to perform the interference measurement; and stopping measuring the interference from the one or more other UEs in the cell based on the one or more periodic beam management reference signals, in response to a trigger signal from the TRP for notifying the UE to stop the interference measurement.

Example 42 includes the method of any of Examples 32-41, wherein the one or more beam management reference signals include a Zero Power Channel Status Information Reference Signal (ZP CSI-RS), a Non-zero Power Channel Status Information Reference Signal (NZP CSI-RS) or a Demodulation Reference Signal (DM-RS).

Example 43 includes the method of any of Examples 32-42, wherein the TRP is a part of an evolved node B (eNB) or a next Generation NodeB (gNB).

Example 44 includes the method of any of Examples 32-36 and 38-43, wherein when the UE and the TRP operate in a dynamic Time Division Duplexing (TDD) mode, the method further includes: decoding one or more uplink beam management reference signals transmitted respectively by one or more other UEs in a neighbor cell for uplink beam management; and measuring interference from the one or more other UEs in the neighbor cell based on the decoded one or more uplink beam management reference signals.

Example 45 includes the method of Example 44, wherein the one or more uplink beam management reference signals include a Sounding Reference Signal (SRS), a Physical Uplink Control Chanel (PUCCH) signal or a Physical Random Access Chanel (PRACH) signal.

Example 46 includes the method of Example 44 or 45, wherein when the cell and the neighbor cell are not synchronized, the method further includes determining a measurement gap based on a timing difference between the cell and the neighbor cell; and measuring the interference from the one or more other UEs in the neighbor cell at a timing scheduled according to the determined measurement gap and a timing of measuring the interference from the one or more other UEs in the cell.

Example 47 includes the method of any of Examples 44-46, wherein the method further includes: generating an interference report including both the measured interference from the one or more other UEs in the cell and the measured interference from the one or more other UEs in the neighbor cell; and sending the interference report to the TRP.

Example 48 includes a method performed at a User Equipment (UE), including: decoding one or more uplink beam management reference signals transmitted respectively by one or more other UEs in a neighbor cell for uplink beam management; and measuring interference from the one or more other UEs in the neighbor cell based on the decoded one or more uplink beam management reference signals.

Example 49 includes the method of Example 48, wherein the one or more uplink beam management reference signals include a Sounding Reference Signal (SRS), a Physical Uplink Control Chanel (PUCCH) signal or a Physical Random Access Chanel (PRACH) signal.

Example 50 includes the method of Example 48, wherein the UE operates in a dynamic Time Division Duplexing (TDD) mode.

Example 51 includes a method performed at a Transmission Reception Point (TRP), including: broadcasting one or more beam management reference signals to one or more User Equipments (UEs) in a cell to perform beam management for the one or more UEs; and encoding an indication to be transmitted to an UE in the cell for indicating a subset of the one or more beam management reference signals as interference measurement resource (IMR) for the UE to measure interference from a respective subset of one or more other UEs in the cell.

Example 52 includes the method of Example 51, wherein the method further includes receiving, from the UE, the measured interference from each of the respective subset of the one or more other UEs in the cell.

Example 53 includes the method of Example 51, wherein the method further includes receiving, from the UE, an interference report including the measured interference from each of the respective subset of the one or more other UEs in the cell.

Example 54 includes the method of any of Examples 51-53, wherein the method further includes dynamically configuring the indication via higher layer signaling or downlink control information (DCI).

Example 55 includes the method of any of Examples 51-54, wherein the one or more beam management reference signals include one or more periodic beam management reference signals broadcasted by the TRP to perform an initial beam acquisition for the one or more UEs in the cell.

Example 56 includes the method of any of Examples 51-54, wherein the one or more beam management reference signals include one or more aperiodic beam management reference signals broadcasted by the TRP to perform a TRP transmission beam refinement for the one or more UEs in the cell.

Example 57 includes the method of Example 55, wherein the method further includes encoding a trigger signal to be transmitted to the UE for notifying the UE to perform the interference measurement based on the one or more periodic beam management reference signals or stop the interference measurement based on the one or more periodic beam management reference signals.

Example 58 includes the method of any of Examples 51-57, wherein the one or more beam management reference signals include a Zero Power Channel Status Information Reference Signal (ZP CSI-RS), a Non-zero Power Channel Status Information Reference Signal (NZP CSI-RS) or a Demodulation Reference Signal (DM-RS).

Example 59 includes the method of any of Examples 51-58, wherein the TRP is a part of an evolved node B (eNB) or a next Generation NodeB (gNB).

Example 60 includes the method of any of Examples 51, 52 and 54-59, wherein when the UE and the TRP operate in a dynamic Time Division Duplexing (TDD) mode, the method further includes receiving, from the UE, an interference report including both the interference from the one or more other UEs in the cell and interference from one or more other UEs in a neighbor cell, wherein the interference from the one or more other UEs in the neighbor cell is measured by the UE based on one or more uplink beam management reference signals transmitted respectively by the one or more other UEs in the neighbor cell for uplink beam management.

Example 61 includes the method of Example 60, wherein the one or more uplink beam management reference signals include a Sounding Reference Signal (SRS), a Physical Uplink Control Chanel (PUCCH) signal or a Physical Random Access Chanel (PRACH) signal.

Example 62 includes the method of Example 60 or 61, wherein when the cell and the neighbor cell are not synchronized, the method further includes determining a measurement gap based on a timing difference between the cell and the neighbor cell; and indicating the UE to measure the interference from the one or more other UEs in the neighbor cell at a timing scheduled according to the determined measurement gap and a timing of measuring the interference from the one or more other UEs in the cell.

Example 63 includes a non-transitory computer-readable medium having instructions stored thereon, the instructions when executed by one or more processor(s) causing the processor(s) to perform the method of any of Examples 32-62.

Example 64 includes an apparatus for a User Equipment (UE), including means for performing the actions of the method of any of Examples 32-50.

Example 65 includes an apparatus for a Transmission Reception Point (TRP), including means for performing the actions of the method of any of Examples 51-62.

Example 66 includes a User Equipment (UE) as shown and described in the description.

Example 67 includes a Transmission Reception Point (TRP) as shown and described in the description.

Example 68 includes a method performed at a User Equipment (UE) as shown and described in the description.

Example 69 includes a method performed at a Transmission Reception Point (TRP) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus for a User Equipment (UE), comprising:
a radio frequency (RF) interface to receive beam management reference signals broadcasted by a Transmission Reception Point (TRP) in a cell, wherein the beam management reference signals are used by the TRP to perform beam management for respective other UEs in the cell; and
processing circuitry coupled with the RF interface, wherein the processing circuitry is configured to:
decode the beam management reference signals;
decode an indication received from the TRP that indicates a subset of the decoded beam management reference signals as an interference measurement resource (IMR) to measure interference from a respective subset of the other UEs in the cell, wherein at least one of the decoded beam management reference signals is associated with a particular UE in the subset of the other UEs;
select the subset of the decoded beam management reference signals as the IMR according to the indication from the TRP; and measure interference from the other UEs in the subset based on the selected subset of the decoded beam management reference signals.

2. The apparatus of claim 1, wherein the processing circuitry is further configured to:
generate an interference report including the measured interference from each of the respective subset of the other UEs; and
send the interference report to the TRP.

3. The apparatus of claim 1, wherein the processing circuitry is further configured to:
perform a channel estimation for the UE based on a beam management reference signal specific to a respective other UE of the other UEs to get an estimated channel characteristic H of the UE subject to interference from the respective other UE; and
obtain the interference from the respective other UE as $R=H*^H$.

4. The apparatus of claim 1, wherein the beam management reference signals comprise periodic beam management reference signals broadcasted by the TRP to perform an initial beam acquisition for the respective other UEs in the cell.

5. The apparatus of claim 1, wherein the beam management reference signals comprise aperiodic beam management reference signals broadcasted by the TRP to perform a TRP transmission beam refinement for the respective other UEs in the cell.

6. The apparatus of claim 4, wherein the processing circuitry is further configured to:
measure the interference from the other UEs in the cell based on the periodic beam management reference signals, in response to a trigger signal from the TRP for notifying the UE to perform the interference measurement; and
stop measuring the interference from the other UEs in the cell based on the periodic beam management reference signals, in response to a trigger signal from the TRP for notifying the UE to stop the interference measurement.

7. The apparatus of claim 1, wherein the beam management reference signals comprise a Zero Power Channel Status Information Reference Signal (ZP CSI-RS), a Non-zero Power Channel Status Information Reference Signal (NZP CSI-RS) or a Demodulation Reference Signal (DM-RS).

8. The apparatus of claim 1, wherein when the UE and the TRP operate in a dynamic Time Division Duplexing (TDD) mode, and wherein the processing circuitry is further configured to:
decode uplink beam management reference signals transmitted respectively by other UEs in a neighbor cell for uplink beam management; and
measure interference from the other UEs in the neighbor cell based on the decoded uplink beam management reference signals.

9. The apparatus of claim 8, wherein the uplink beam management reference signals comprise a Sounding Reference Signal (SRS), a Physical Uplink Control Chanel (PUCCH) signal or a Physical Random Access Chanel (PRACH) signal.

10. The apparatus of claim 8, wherein when the cell and the neighbor cell are not synchronized, the processing circuitry is further configured to:
determine a measurement gap based on a timing difference between the cell and the neighbor cell; and
measure the interference from the other UEs in the neighbor cell at a timing scheduled according to the determined measurement gap and a timing of measuring the interference from the other UEs in the cell.

11. The apparatus of claim 8, wherein the processing circuitry is further configured to:
generate an interference report including both the measured interference from the other UEs in the cell and the measured interference from the other UEs in the neighbor cell; and
send the interference report to the TRP.

12. An apparatus for a User Equipment (UE), comprising:
a radio frequency (RF) interface to receive uplink beam management reference signals transmitted respectively by other UEs in a neighbor cell for uplink beam management; and
processing circuitry coupled with the RF interface, wherein the processing circuitry is configured to:
decode uplink beam management reference signals from a subset of the other UEs, wherein the subset of the other UEs is selected based at least on an indication received from a Transmission Reception Point (TRP) that indicates beam management reference signals corresponding to the subset of the other UEs as an interference measurement resource (IMR); and
measure interference from the subset of the other UEs in the neighbor cell based on the decoded uplink beam management reference signals.

13. The apparatus of claim 12, wherein the uplink beam management reference signals comprise a Sounding Reference Signal (SRS), a Physical Uplink Control Chanel (PUCCH) signal or a Physical Random Access Chanel (PRACH) signal.

14. An apparatus for a Transmission Reception Point (TRP), comprising:
a radio frequency (RF) interface; and
processing circuitry coupled with the RF interface, wherein the processing circuitry is configured to:
broadcast beam management reference signals to User Equipments (UEs) in a cell to perform beam management for the UEs; and
encode an indication to be transmitted to an UE in the cell for indicating a subset of the beam management reference signals as interference measurement resource (IMR) for the UE to measure interference from a respective subset of other UEs in the cell, wherein at least one of the beam management reference signals in the subset of the beam management reference signals is associated with a particular UE in the subset of the other UEs, and
wherein the RF interface is configured to transmit the encoded indication to the UE.

15. The apparatus of claim 14, wherein the processing circuitry is further configured to: receive, from the UE, an interference report including the measured interference from each of the respective subset of the other UEs in the cell.

16. The apparatus of claim 14, wherein the processing circuitry is further configured to:
dynamically configure the indication via higher layer signaling or downlink control information (DCI).

17. The apparatus of claim 14, wherein the beam management reference signals comprise periodic beam management reference signals broadcasted by the TRP to perform an initial beam acquisition for the UEs in the cell.

18. The apparatus of claim 14, wherein the beam management reference signals comprise aperiodic beam management reference signals broadcasted by the TRP to perform a TRP transmission beam refinement for the UEs in the cell.

19. The apparatus of claim 17, wherein the processing circuitry is further configured to: encode a trigger signal to be transmitted to the UE for notifying the UE to perform the interference measurement based on the periodic beam management reference signals or stop the interference measurement based on the periodic beam management reference signals.

20. The apparatus of claim 14, wherein the beam management reference signals comprise a Zero Power Channel Status Information Reference Signal (ZP CSI-RS), a Non-zero Power Channel Status Information Reference Signal (NZP CSI-RS) or a Demodulation Reference Signal (DM-RS).

21. The apparatus of claim 14, wherein when the UE and the TRP operate in a dynamic Time Division Duplexing (TDD) mode, and wherein the processing circuitry is further configured to:
receive, from the UE, an interference report including both the interference from the other UEs in the cell and interference from other UEs in a neighbor cell,
wherein the interference from the other UEs in the neighbor cell is measured by the UE based on uplink beam management reference signals transmitted respectively by the other UEs in the neighbor cell for uplink beam management.

22. The apparatus of claim 21, wherein the uplink beam management reference signals comprise a Sounding Reference Signal (SRS), a Physical Uplink Control Chanel (PUCCH) signal or a Physical Random Access Chanel (PRACH) signal.

23. The apparatus of claim 21, wherein when the cell and the neighbor cell are not synchronized, the processing circuitry is further configured to:
determine a measurement gap based on a timing difference between the cell and the neighbor cell; and
indicate the UE to measure the interference from the other UEs in the neighbor cell at a timing scheduled according to the determined measurement gap and a timing of measuring the interference from the other UEs in the cell.

* * * * *

UNITED STATES PATENT AND TRADEMARK OFFICE
CERTIFICATE OF CORRECTION

PATENT NO. : 11,018,730 B2  
APPLICATION NO. : 16/484040  
DATED : May 25, 2021  
INVENTOR(S) : Guotong Wang et al.

Page 1 of 1

It is certified that error appears in the above-identified patent and that said Letters Patent is hereby corrected as shown below:

On the Title Page

Item [72], Column 1, Line 1, delete "Guolong" and insert -- Guotong --;

In the Claims

Column 25, Line 12, in Claim 3, delete "abeam" and insert -- a beam --;

Column 25, Line 18, in Claim 3, delete "R=H*$^H$." and insert -- R=H*$H^H$. --;

Column 25, Line 58, in Claim 9, delete "Chanel" and insert -- Channel --;

Column 25, Line 59, in Claim 9, delete "Chanel" and insert -- Channel --;

Column 26, Line 31, in Claim 13, delete "Chanel" and insert -- Channel --;

Column 26, Line 32, in Claim 13, delete "Chanel" and insert -- Channel --;

Column 28, Line 8, in Claim 22, delete "Chanel" and insert -- Channel --; and

Column 28, Line 9, in Claim 22, delete "Chanel" and insert -- Channel --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*